3,297,798
ALPHA-(CHLOROMETHYLENE) BENZYL PHOSPHATE
Donald D. Phillips, Modesto, Calif., assignor to Shell Oil Company, New York, N.Y., a corporation of Delaware
No Drawing. Filed Apr. 5, 1963, Ser. No. 270,799
1 Claim. (Cl. 260—957)

This application is a continuation-in-part of copending application Serial No. 180,860 filed March 19, 1962, now abandoned.

This invention relates to an organophosphorus compound that has been found to be an effective insecticide, with particularly high activity toward flies, caterpillars and worms. Further, this compound has been found to have a moderately long life, because of which it is of particular value as an insecticide for applications in which it is desired to protect plants from insects for a substantial period of time—for example, during the growing and/or blooming stages—yet it is not desirable to have carry-over of the insecticide—for example, into the harvest stage and/or into the following season, where the insecticide is used in soil. The compound of this invention has been found to be effective against insects in soil.

The compound of this invention is dimethyl 2,4-dibromo-alpha-(chloromethylene)benzyl phosphate, of the formula

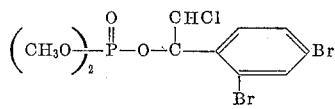

hereinafter designated, for the sake of brevity, as Compound A.

This compound is readily prepared by the reaction of trimethyl phosphite with 2,2-dichloro-2',4'-dibromoacetophenone, the following preparation being illustrative ("parts" means parts by weight unless otherwise designated, and "parts by weight" bear the same relation to "parts by volume" as does the kilogram to the liter):

EXAMPLE I

*Dimethyl 2,4-dibromo-alpha-(chloromethylene) benzyl phosphate*

(A) *Preparation of 2,2-dichloro-2',4'-dibromoacetophenone.*—To 62 parts of aluminum chloride was added, over two minutes, 100 parts of meta-dibromobenzene. To this slurry, with stirring, was added 75 parts of dichloroacetyl chloride over a period of three minutes. The mixture then was stirred and heated slowly to 95° C. At this point, an additional 19 parts of dichloroacetyl chloride was added and the mixture was heated, with stirring, at 95° C. for two and one-half hours. The resulting complex was decomposed by stirring the mixture with ice and hydrochloric acid. Ether was added, the phases were separated, the organic phase was washed with saturated sodium bicarbonate solution, water and saturated salt (NaCl) solution, dried, the ether was evaporated, and the resulting brown oil was distilled to give 129 parts (88% yield) of 2,2-dichloro-2',4'-dibromoacetophenone, boiling range 108–118.5° C. (0.02–0.06 torr), index of refraction ($n_D^{25}$), 1.6210. The identity of the ketone was confirmed by elemental analysis.

(B) *Preparation of dimethyl 2,4-dibromo-alpha-(chloromethylene)benzyl phosphate.*—To 123 parts of the 2,2-dichloro-2',4'-dibromoacetophenone was added 53 parts of trimethyl phosphite. The addition was made over a 45-minute period, keeping the temperature between 35°–50° C. by ice-cooling. The reaction mixture was heated to 105–110° and held at that temperature for 15 minutes; then it was cooled to room temperature and diluted with ether. By chilling in an ice-bath and scratching, crystallization was induced to yield 112 parts (75%) of dimethyl 2,4-dibromo-alpha-(chloromethylene)benzyl phosphate, melting point: 91.5–92.5°.

The analysis (percent by weight) calculated for $C_{10}H_{10}PO_4Br_2Cl$: P, 7.4; halogen equivalent: 140. Actual analysis (percent by weight) of the product: P, 7.5; halogen equivalent: 138.

A sample of the product was subjected to the action of potassium permanganate, water and sodium bicarbonate, to yield 2,4-dibromobenzoic acid, identified by comparison of its melting point with the known melting points of the various isomers of dibromobenzoic acid; this established the positions of the bromine atoms on the phenyl ring.

Under the conditions used in preparing the dibromoacetophenone, it has been found that bromine atoms on the phenyl ring are labile, and may change their relative positions of the ring. The favored configuration has been found to be the 2,4-configuration, with respect to the carbon atom of the phenyl ring that is bonded to the carbonyl group. It is possible that an equilibrium is involved, with other configuration being formed; however, the 2,4-configuration has been found to be dominant. Thus, in another experiment, using p-dibromobenzene as the starting material, the primary product was the 2',4'-dibromoacetophenone, just as where m-dibromobenzene was the starting material. Because of the dominance of the 2,4-configuration, it is not necessary to start with m-dibromobenzene, but any of the other isomeric dibromobenzenes apparently can be used.

Further, from the standpoint of insecticidal effectiveness, it is not necessary to isolate dimethyl 2,4-dibromoalpha-(chloromethylene)benzyl phosphate from the crude reaction mixture—the crude mixture, or the crude phosphate product, can be used effectively as an insecticide. That is to say, the mixture of isomeric phosphates which can result from the preparative procedures which have been described can be used effectively as an insecticide, without the necessity for isolating the particular 2,4-dibromophenyl isomer to which this invention is specifically directed.

The compound of this invention has been found to be an effective insecticide, against a variety of insects typical of various kinds of insects, including flies, moths, mites, bugs, mosquitoes, caterpillars (including worms), weevils and bettles. The compound is stable on storage, is essentially nonphytotoxic at insecticidally effective dosages, is effective in soil and is particularly effective against dipterous insects (flies), coleopterous insects (bettles), and worms.

By the term "insects" thus is meant not only the members of the class Insecta, but also related or similar invertebrate animal organisms belonging to the allied classes of arthropods and including ticks, mites, spiders, wood lice, and the like.

The compound of the invention is effective against the immature forms of insects as well as against the mature forms which attack plants. Thus, this compound kills "worms," by which is meant not only the true worms, but also those immature forms of insects—larvae, caterpillars, etc.—which are generally known as "worms," and including larvae of the western spotted cucumber bettle (*Diabrotica undecimpunctata undecimpunctata*), corn earworms (*Heliothis zea*) cabbage worms (*Pieris rapae*), Pacific coast wireworms (*Limhonium canus*) and the like.

The effectiveness of the compound of this invention as an insecticide is demonstrated by the following experiments and the results thereof.

EXAMPLE II

Solutions of Compound A were made up employing either a neutral petroleum distillate boiling within the kerosene range, or acetone, as the solvent. Tests were carried out using the common housefly, *Musca domestica*, as the test insect, the method used being that described by Y. P. Sun, Journal of Economic Entomology, volume 43, pp. 45 et seq. (1950). Parallel tests were conducted employing dieldrin, a commercial insecticide highly active against the housefly. The toxicity of Compound A was compared to that of dieldrin, its relative toxicity being expressed in terms of the relationship between the amount of Compound A and the amount of dieldrin required to produce 50% mortality of the houseflies. Assigning dieldrin an arbitrary rating of 100, the toxicity of Compound A was expressed in terms of the toxicity index, which compares the activity of the test compound on a percentage basis with that of the dieldrin. That is to say, a test compound having a toxicity index of 50 would be half as active as dieldrin, while one having a toxicity index of 200 would be twice as active as dieldrin.

The toxicity of Compound A was determined against the vinegar fly (*Drosophila melanogaster*) as a deposit on glass, the standard insecticide used being malathion.

The results of all of these tests is set out in Table I.

*Table I*

| Test Compound | Toxicity Index | |
| --- | --- | --- |
| | Housefly | Vinegar fly |
| A | 118 | 800 |

EXAMPLE III

The activity of Compound A with respect to the corn earworm, *Heliothis zea*, was determined by caging corn earworm larvae on cut broad bean plants inserted in water after formulations of Compound A, prepared by dissolving an acetone solution of the compound in water, had been sprayed thereon. Two replicates were used with each test, various tests being directed to different concentrations of Compound A in the liquid formulations. The $LC_{50}$ values are set out on Table II. In a similar manner, tests were conducted with respect to the diamond back moth (*Plutella maculipennis*), the imported cabbage worm (*Pieris rapae*) and the elm leaf beetle (*Galerucella luteola*), with the results ($LC_{50}$) being set out in Table II. The activity of Compound A with respect to the rice weevil, *Sitophilus oryzae*, was determined by pouring a measured amount of a solution of Compound A over adult rice weevils in a container having a perforated bottom, excess solution immediately draining away. Ten seconds after the solution had been poured on the weevils, the weevils were dried with blotter paper, transferred to containers and held in a controlled temperature and humidity room for 24 hours. Counts then were made to determine the number of weevils killed (which included moribund weevils). Several replicates were conducted, several concentrations of the Compound A in the solution being used at each concentration. Table II sets out the $LC_{50}$ concentrations of Compound A with respect to these weevils. The activity Compound A with respect to the western spotted cucumber beetle, *Diabrotica undecimpunctata undecimpunctata* was determined in a similar manner: second instar larvae of this beetle were treated with a solution of Compound A, immediately dried by blotting, then held for 24 hours, after which the mortality was determined. Table II sets out the $LC_{50}$ concentrations of Compound A with respect to these beetles.

*Table II*

MEDIUM LETHAL CONCENTRATION ($LC_{50}$)
[Grams per 100 milliliters solvent]

| Test Material | Test Insect | | | | | |
| --- | --- | --- | --- | --- | --- | --- |
| | Corn Earworm | Western Spotted Cucumber Beetle | Rice Weevil | Diamond Back Moth | Cabbage Worm | Elm Leaf Beetle |
| Compound A | 0.0083 | 0.0003 | 0.0025 | .00045 | 0.0014 | 0.0076 |

EXAMPLE IV

Compound A was tested to ascertain its effectiveness against the large milkweed bug (*Oncopeltus fasciatus*), as follows:

Solutions of Compound A in acetone, were applied by pipette to Petri dishes, and the acetone was allowed to evaporate. The concentration of Compound A in solution and the amount of solution was controlled to give the desired dosage of test material in milligrams of test material per Petri dish. The dishes were held at 80° F. and 50% relative humidity. Adults of the large milkweed bug exposed for 24 hours to the treated dishes after which mortality counts were made. The following results, expressed as the concentration in milligrams of Compound A per dish required to kill 50% of the insects (i.e., the $LC_{50}$ concentration), were obtained:

*Table III*

LARGE MILKWEED BUG

Test Compound: $LC_{50}$ (mg./dish)
   Compound A _____ 0.0175

EXAMPLE V

The extended life of Compound A when applied to surfaces exposed to the atmosphere was demonstrated by the following tests:

Pinto bean plants were sprayed with a solution of suspension (approximately 0.5 pound per acre) of Compound A. At intervals, leaves were clipped from the sprayed plant, put in Petri dishes and common houseflies exposed to the leaves for 24 hours. Mortality then was determined. The results are reported as the housefly mortality for the interval in days after spraying.

*Table IV*

| Test Compound | Percent Mortality at Indicated Days after Spraying | | | | |
| --- | --- | --- | --- | --- | --- |
| | 0 | 1 | 2 | 3 | 7 |
| Compound A | 100 | 99 | 99 | 90 | 58 |

EXAMPLE VI

The Compound A also was tested to determine its toxicity with respect to mosquito (*Anopheles albimanus*) larvae, as follows: sufficient of a 0.01% acetone solution of Compound A was dissolved in 100 milliliters of water to provide the desired concentration of the compound. Ten fourth-instar *A. albimanus* larvae were introduced into each of two replicates. The larvae were exposed to the solution of Compound A for twenty-four hours, then mortality counts were made. Various concentrations of Compound A were used to determine the $LC_{50}$ concentration, expressed in parts by weight of Compound A per million parts by weight of the solution. Table V summarizes the results.

*Table V*

Test Compound:                         $LC_{50}$ (p.p.m.)
A ------------------------------------------ 0.04

EXAMPLE VII

The residual properties of Compound A was determined as follows:

Solutions of Compound A in acetone were sprayed upon the surface of plywood panels and test insects caged against the treated panels, one series of exposures being made immediately after application of the test material, and later series of exposures being made at weekly intervals thereafter. The test insects were adult common houseflies (*Musca domestica*) and *Anopheles albimanus* mosquitoes. At a dosage of 50 milligrams of the test material per square foot of the surface of the wood, the following control of houseflies and mosquitoes was obtained.

Compound A gave 70% control of houseflies and 65% control of mosquitoes at the end of four weeks.

EXAMPLE VIII

The effectiveness and substantial life of Compound A in soil was demonstrated by the following tests:

An acetone solution of Compound A was sprayed onto soil, as the soil was being tumbled in a mixer, so as to uniformly disseminate Compound A into the soil and provide a concentration of 3.3 parts by weight of the soil. The soil then was dried to remove the actone, moistened with water and divided into jars. The jars were sealed and held at 80° F. One day after the soil had been placed in the jars, certain of the jars were opened and third instar larvae of the western spotted cucumber beetle (*Diabrotica undecimpunctata undecimpunctata*) were introduced into the soil. The jars were sealed, held for 24 hours, then the mortality of the larvae was determined. This procedure was repeated at intervals of 8 and 15 days after introduction of the treated soil into the jars.

The following results were obtained.

*Table VI*

| Test Compound | Percent control, at indicated day after introduction of test compound into the soil | | |
|---|---|---|---|
| | 1 | 8 | 15 |
| A | 90 | 50 | 30 |

EXAMPLE IX

Cotton plants were sprayed with a formulation of Compound A at the rate of 0.5 pound Compound A per acre and adult cotton boll weevils, *Anthonomus grandis*, caged onto sprayed parts of the plants. Ten weeviles were used in replicates of three. Compound A killed 53% of the weevils 24 hours after being caged on the plants.

EXAMPLE X

To evaluate Compound A for potential use as a cattle spray wool rugs were sprayed to provide a dosage of 25 milligrams of Compound A per square foot of surface. Twenty-five adult stableflies (*Stomoxys calcitrans*) were caged on the treated rugs for 10 minutes, then placed in holding cages for 24 hour mortality counts. Each treatment was replicated twice. The treated rugs were stored at 80° F. and retested at intervals later. Compound A gave 100% mortality seven days after treatment.

The compound of this invention can be employed for insecticidal purposes by the use of any of the techniques which are conventionally employed in the art, with due regard to the particular application contemplated—i.e., whether the compound is to be applied to the surfaces of plants, buildings and the like, and including the surface of soil, and absorptive materials such as paper, sand, bricks, concrete, plaster, plant materials used in buildings, and the like, whether it is to be disseminated into soil, whether it is to be incorporated into surface coatings, such as waxes, resins, paints, lacquers, varnishes, whether it is to be incorporated in various plastic materials, including plastic sheetings, in order to obtain packaging and wrapping materials themselves resistant to insect attack and able to protect objects packed in them from such attack, or whether it be used in some other manner such as to exploit the long life of the compound of the invention.

When the compound of this invention is to be used as a conventional insecticide applied to surfaces—of plants, buildings, soil and other absorptive materials or the like—the compound can either be sprayed or otherwise applied in the form of a solution of dispersion, or it can be absorbed on an inert, finely divided solid and applied as a dust. Useful solutions for application by spraying, brushing, dipping, and the like can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponine, gelatin, casein, long-chain fatty alcohols, alkyl aryl sulfonates, long-chain alkyl sulfonates, phenol-ethylene oxide condensates, $C_{12}$ to $C_{20}$ amines and ammonium salts, and the like. These solutions can be employed as such, or more preferably they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the compound of the present invention can be employed as an aerosol, as by dispersing the same into the atmosphere by means of a compressed gas.

The concentration of the compound to be used with the above carriers is dependent upon many factors, including the carrier employed, the method and conditions of application, and the insect species to be controlled, a proper consideration and resolution of these factors being within the skill of those versed in the insecticide art. In general, however, the compound of this invention is effective in concentrations of from about 0.01 to 0.5% based upon the total weight of the composition, though under some circumstances as little as about 0.00001% or as much as 2% or even more (for example, up to 25% of the total weight of the mixture) of the compound can be employed with good results from an insecticidal standpoint, as wherein high concentrations of active material are used in low-volume sprays or dusts.

The compound of this invention is employed as a soil insecticide by conventional techniques which insure uniform intimate dissemination of an effective dosage of the compound in the soil. Judging by the experimental work which has been performed, the insecticidally effective dosages of the compound of the invention lie in the range of a few parts per million parts by weight of the soil. Thus, the effective dosages appear to lie within the range of from about three to five parts, up to about fifty to one hundred parts per million, on a weight basis based on the weight of the air-dry soil. This is not to say that in some cases, a higher dosage—of up to as much as 500 parts by million on the same basis—may not be used to advantage, but in most cases the effective dosage appears to lie within the range of from about 3 to about 50 parts per million on that basis. In more practical terms, the effective dosage appears to amount to from about 0.25 to about 100 pounds of the insecticide per acre of land, depending upon the depth of soil to be treated, which may be as great as 6, or 8, or even 12 inches, depending upon the particular species of plants and insecticides involved. Generally, dosages of from about 1 to about 10 pounds of the insecticide per acre of land are preferred.

The insecticide may be dissolved and/or dispersed in a suitable liquid diluent and the solution or dispersion applied to and mixed with the soil, or the insecticide may be formulated with a suitable solid carrier and applied as a dust, powder or as granules to the soil and admixed therewith. The insecticide of the invention is not very soluble in water, so that water is not a suitable solvent. By the use of suitable emulsifying and dispersing agents, however, this insecticide can be emulsified or dispersed in water and the emulsion applied to the soil to be treated to provide effective control of the insect therein. Any of the usual emulsifying and dispersing agents commonly employed in forming aqueous emusions and suspensions of water-insoluble materials can be used for this purpose. Generally but a small concentration of the emulsifying agent is required, as little as 0.05 percent of the weight of the final formulation being effective in many cases, while seldom will more than about 10% of the weight of the final formulation be required. Usually, the concentration of the emulsifying or dispersing agent will be from about 0.5 to about 5 percent of the weight of the formulation. Alternatively, or in addition, in some cases it may be to advantage to dissolve the insecticide in a solvent which can readily be dispersed in water to produce a heterogeneous dispersion of the insecticide in the water.

Where the insecticide is to be applied as a solution, suitable solvents include water-immiscible alcohols, ketones and aromatic hydrocarbons, such as, for example, isopropyl alcohol, benzene, acetone, methyl ethyl ketone, secondary butyl alcohol, kerosene, chlorinated hydrocarbons, various non-phytotoxic hydrocarbon fractions which are ordinarily used disseminating agricultural chemicals, including spray oil, horticultural oils, and the like.

The suitable solid carriers ordinarily are those which are essentially inert in the soil and which are not hygroscopic—for if they are hygroscopic the final formulation will not remain dry and free-flowing. In some cases, however, it may be desirable to employ as carrier a solid which is not inert—as, for example, a solid fertilizer such as a commercial mixed solid fertilizer, rock phosphate, urea or the like. Suitable inert carriers are those well known to the art including the clays such as the kaolinites, the bentonites and the attapulgites; other minerals in natural state such as talc, pyrophyllite, quartz, diatomaceous earth, fuller's earth, chalk, rock phosphate and sulfur; and chemically modified minerals, such as acid washed bentonites, precipitated calcium phosphates, precipitated calcium carbonate and colloidal silica. These diluents may represent a substantial portion, for example, 50 to 98 percent by weight of the entire formulation.

These solid formulations can be prepared by grinding or air-milling the carrier and insecticide together. Alternatively, the solid formulations can be formed by dissolving the insecticide in a suitable solvent, such as a volatile solvent, impregnating and/or coating the particles with the solution and if necessary, removing the solvent. The formulation also can be effected by melting the insecticide and mixing the molten insecticide with the carrier. Granular formulations can be prepared by impregnating and/or coating granules of the carrier with the insecticide or by forming granules of mixtures of the insecticide and carrier.

From the standpoint of mechanics, the insecticide, neat or as a formulation, is applied to the soil in any manner which enables its intimate admixture with the soil to be treated. Thus the insecticide, which includes formulations thereof, can be applied to the surface of the soil, or it can be applied below the surface of the soil, and then admixed with the soil. If in the form of a liquid formulation, the insecticide can be drenched onto the surface of the soil or injected into the soil. In other words, conventional means, well known in the art, can be used to effect intimate admixture of the insecticide with the soil to be treated. The formulations of the insecticide can also contain other materials, such as nematocides, fungicides, insecticides of different action and/or different physical characteristics, hormones, and/or fertilizers, to form multipurpose compositions.

The insecticide of this invention also can be used to control soil-dwelling insects by treating seed with it.

I claim as my invention:

Dimethyl 2,4-dibromo-alpha-(chloromethylene)benzyl phosphate.

References Cited by the Examiner

UNITED STATES PATENTS

| | | | |
|---|---|---|---|
| 2,870,186 | 1/1959 | Orloff et al. | 260—461 |
| 2,929,833 | 3/1960 | Orloff et al. | 260—461 |
| 3,094,457 | 6/1963 | Birum | 167—30 |
| 3,095,351 | 6/1963 | Godfrey et al. | 167—30 |
| 3,102,842 | 9/1963 | Phillips et al. | 260—957 X |
| 3,116,201 | 12/1963 | Whetstone et al. | 260—957 X |
| 3,174,990 | 3/1965 | Ward et al. | 260—957 |

FOREIGN PATENTS 1,267,967   6/1961   France.

CHARLES B. PARKER, *Primary Examiner.*

JULIAN S. LEVITT, *Examiner.*

FRANK SIKORA, GEORGE A. MENTIS, B. BILLIAN,
*Assistant Examiners.*